US011760503B2

(12) United States Patent
Chavez et al.

(10) Patent No.: US 11,760,503 B2
(45) Date of Patent: *Sep. 19, 2023

(54) AUGMENTED REALITY SYSTEM FOR PILOT AND PASSENGERS

(71) Applicant: Textron Innovations Inc., Providence, RI (US)

(72) Inventors: Jeremy Robert Chavez, Colleyville, TX (US); Levi Bilbrey, Fort Worth, TX (US); James R. Williamson, Southlake, TX (US)

(73) Assignee: Textron Innovations Inc., Providence, RI (US)

( * ) Notice: Subject to any disclaimer, the term of this patent is extended or adjusted under 35 U.S.C. 154(b) by 315 days.

This patent is subject to a terminal disclaimer.

(21) Appl. No.: 17/039,081

(22) Filed: Sep. 30, 2020

(65) Prior Publication Data

US 2021/0206507 A1 Jul. 8, 2021

Related U.S. Application Data

(63) Continuation of application No. 15/913,789, filed on Mar. 6, 2018, now Pat. No. 10,822,108.

(Continued)

(51) Int. Cl.
*B64D 43/00* (2006.01)
*A42B 3/30* (2006.01)
(Continued)

(52) U.S. Cl.
CPC .............. *B64D 43/00* (2013.01); *A42B 3/042* (2013.01); *A42B 3/0433* (2013.01); *A42B 3/228* (2013.01);
(Continued)

(58) Field of Classification Search
CPC ............ B64D 11/0626; B64D 11/0647; B64D 11/0689; B64D 11/0624; B64D 43/00;
(Continued)

(56) References Cited

U.S. PATENT DOCUMENTS 8,063,798 B2 11/2011 Cernasov et al.
9,285,589 B2 3/2016 Osterhout et al.
(Continued)

OTHER PUBLICATIONS

Chappell et al., The VNAV Tutor: addressing a mode awareness difficulty for pilots of glass cockpit aircraft, 1997, IEEE, p. 372-385 (Year: 1997).*

(Continued)

*Primary Examiner* — Marc McDieunel
(74) *Attorney, Agent, or Firm* — WHITAKER CHALK SWINDLE & SCHWARTZ PLLC; Enrique Sanchez, Jr.

(57) ABSTRACT

An aircraft having an augmented reality flight control system integrated with and operable from the pilot seat and an associated pilot headgear unit, wherein the flight control system is supplemented by flight-assisting artificial intelligence and geo-location systems is presented. The present disclosure includes an augmented reality flight control system incorporating real-world objects with virtual elements to provide relevant data to a pilot during aircraft flight. A translucent substrate is disposed in the pilot's field of view such that the pilot can see therethrough, and observe virtual elements displayed on the substrate. The system includes a headgear that is worn by the pilot. A flight assistance module is configured to receive data related to the aircraft and provide predictive assistance to the pilot during flight based on the received data based in part on a pilot profile having preferences related to the pilot.

20 Claims, 5 Drawing Sheets

Related U.S. Application Data

(60) Provisional application No. 62/467,680, filed on Mar. 6, 2017.

(51) Int. Cl.

| | | |
|---|---|---|
| *G06F 3/01* | (2006.01) | |
| *G01C 23/00* | (2006.01) | |
| *G08G 5/00* | (2006.01) | |
| *B64C 13/18* | (2006.01) | |
| *B64C 13/22* | (2006.01) | |
| *A42B 3/04* | (2006.01) | |
| *A42B 3/22* | (2006.01) | |
| *G06T 19/00* | (2011.01) | |
| *G02B 27/01* | (2006.01) | |
| *B64D 11/06* | (2006.01) | |
| *B64C 13/04* | (2006.01) | |
| *B64C 1/06* | (2006.01) | |
| *B64C 1/18* | (2006.01) | |
| *B64C 1/40* | (2006.01) | |
| *G06F 3/044* | (2006.01) | |
| *B64C 13/10* | (2006.01) | |
| *B64D 11/00* | (2006.01) | |

(52) U.S. Cl.
CPC .............. *A42B 3/30* (2013.01); *B64C 1/066* (2013.01); *B64C 1/18* (2013.01); *B64C 1/40* (2013.01); *B64C 13/042* (2018.01); *B64C 13/044* (2018.01); *B64C 13/18* (2013.01); *B64C 13/22* (2013.01); *B64D 11/0626* (2014.12); *B64D 11/0647* (2014.12); *B64D 11/0689* (2013.01); *G01C 23/00* (2013.01); *G01C 23/005* (2013.01); *G02B 27/017* (2013.01); *G06F 3/012* (2013.01); *G06F 3/017* (2013.01); *G06T 19/006* (2013.01); *G08G 5/0004* (2013.01); *G08G 5/0017* (2013.01); *G08G 5/0021* (2013.01); *G08G 5/0039* (2013.01); *G08G 5/0047* (2013.01); *G08G 5/0091* (2013.01); *B64C 13/10* (2013.01); *B64D 11/0015* (2013.01); *B64D 11/0641* (2014.12); *B64D 11/0646* (2014.12); *B64D 2011/0046* (2013.01); *G06F 3/044* (2013.01)

(58) Field of Classification Search
CPC ........ B64D 2011/0046; B64D 11/0015; B64D 11/0646; B64D 11/0641; G08G 5/0047; G08G 5/0017; G08G 5/0004; G08G 5/0091; G08G 5/0021; G08G 5/0039; B64C 1/066; B64C 13/042; B64C 13/22; B64C 13/18; B64C 1/40; B64C 13/044; B64C 1/18; B64C 13/10; G02B 27/017; G02B 2027/0138; G06F 3/017; G06F 3/012; G06F 3/044; G01C 23/005; G01C 23/00; A42B 3/0433; A42B 3/30; A42B 3/042; A42B 3/228; G06T 19/006; Y02T 50/40

See application file for complete search history.

(56) References Cited

U.S. PATENT DOCUMENTS

| | | | |
|---|---|---|---|
| 9,581,819 | B1* | 2/2017 | Boggs .................. G02B 27/017 |
| 9,728,006 | B2* | 8/2017 | Varga .................. G06F 3/04815 |
| 9,759,917 | B2 | 9/2017 | Osterhout et al. |
| 9,892,489 | B1* | 2/2018 | Roggendorf ............ G06T 19/00 |
| 9,994,228 | B2* | 6/2018 | Krueger ............. A61B 5/02055 |
| 9,995,936 | B1* | 6/2018 | Macannuco ............ G06F 3/013 |
| 10,822,108 | B2* | 11/2020 | Chavez .................... B64C 1/18 |
| 2009/0295602 | A1 | 12/2009 | Cernasov et al. |
| 2012/0194419 | A1 | 8/2012 | Osterhout et al. |
| 2012/0194550 | A1 | 8/2012 | Osterhout et al. |
| 2012/0242698 | A1 | 9/2012 | Haddick et al. |
| 2012/0249797 | A1 | 10/2012 | Haddick et al. |
| 2015/0309316 | A1 | 10/2015 | Osterhout et al. |
| 2015/0326570 | A1 | 11/2015 | Publicover et al. |
| 2016/0187654 | A1 | 6/2016 | Border et al. |
| 2017/0148340 | A1* | 5/2017 | Popa-Simil .............. G09B 9/48 |

OTHER PUBLICATIONS

Nuovo et al., An agent-based infrastructure for monitoring aviation pilot's situation awareness, 2011, IEEE, p. 1-7 (Year: 2011).*

Funk et al., Agent-based pilot-vehicle interfaces: concept and prototype, 1992, IEEE, p. 1309-1322 (Year: 1992).*

Bhanu et al., A system for obstacle detection during rotorcraft low altitude flight, 1996, IEEE, p. 875-897 (Year: 1996).*

Cai et al., Multi-source information fusion augmented reality benefited decision-making for unmanned aerial vehicles: A effective way for accurate operation, 2011, IEEE, pg. (Year:2011).

Funk et al., Agent-based pilot-vehicle interfaces: concept and prototype, 1992, IEEE,pg. (Year: 1992).

Mulgund et al., A Situation-Driven Adaptive Pilot/Vehicle Interface, 1996, IEEE, p. 196-198 (Year: 1996).

Shabaneh et al., Probability Grid Mapping System for Aerial Search, 2009,IEEE,p. 521-526 (Year: 2009).

Molinerros et al., Vision-based augmented reality for guidance in airport runways and taxiways, 2004, IEEE, p. 1-2 (Year 2004).

\* cited by examiner

AUGMENTED REALITY SYSTEM FOR PILOT AND PASSENGERS

CROSS-REFERENCE TO RELATED APPLICATION

The present application is a continuation of U.S. patent application Ser. No. 15/913,789, entitled "AUGMENTED REALITY SYSTEM FOR PILOT AND PASSENGERS," filed Mar. 6, 2018, and U.S. Patent Application Ser. No. 62/467,680, entitled "ADVANCED HELICOPTER," filed Mar. 6, 2017, the contents of each are hereby incorporated by reference in their entirety.

BACKGROUND OF THE INVENTION

1. Field of the Invention

The present invention generally relates to aircraft and more particularly to aircraft with improvements in instrumentation and flight control based on augmented reality technologies.

2. Background of the Invention

Conventional aircraft are characterized by massive instrumentation positioned in front of the pilot seat, and manual flight controls. The massive instrumentation positioned in front of the pilot obscures the pilot's visibility, which may become crucial in emergency situations where a direct line of sight to topography just ahead and below the aircraft may be necessary.

As in any aircraft, weight is a primary consideration that directly affects fuel efficiency, maneuverability, the capacity of the aircraft to carry payloads, etc. Essential structures such as the instrument panels, communication equipment, manual flight control mechanisms installed in the body of the aircraft contributes substantially to the weight of the aircraft.

Conventional aircraft embody most of the disadvantages of weight, the requirements of massive instrumentation and flight control mechanisms, limited interior space, limited functional adaptability, etc.

Newer aircraft also suffer from several disadvantages. Typically, newer aircraft have more complicated components requiring power assisted or fully-powered control systems. The complexity of these systems require more and more cockpit real estate to account for their control in addition to the already massive instrumentation panels. Additionally, the instrumentation panel can be the source many pilot injuries during a crash. The addition of more components to the instrumentation panel further compresses the pilots already limited working space, adds weight to the aircraft, and creates unnecessary risk of injury during a crash.

Traditional aircraft are reactive to pilot input. A pilot must perform some function to effect some state change in the aircraft. "Fly-by-wire" systems are helpful to a pilot, but are limited in the functionality they can provide a pilot. For example, "fly-by-wire" systems provide no support for communications or other relevant data that can be useful to a pilot. They also fail to provide the flexibility to adapt to the preferences of different pilots.

There is thus a need for an aircraft that lacks these disadvantages so that an aircraft that is efficient, is safer to operate, and can benefit from updated flight control mechanisms and instrumentation.

SUMMARY OF THE INVENTION

Accordingly there is disclosed an aircraft, comprising an augmented reality flight control system integrated with and operable from the pilot seat and an associated pilot headgear unit, wherein the flight control system is supplemented by flight-assisting artificial intelligence and geo-location systems.

In other aspects, the invention includes:

a pilot headgear system including a helmet and a transparent visor attached thereto, wherein the visor serves as a screen for projecting a heads-up display; a virtual display of aircraft instrumentation that replicates an instrument panel of the advanced helicopter on the visor; and a communications headset including microphone and loudspeakers embedded within the pilot headgear.

a virtual display system configurable to display computer-generated images for presenting and manipulating at least flight information, flight plans, maps, spatial representations and symbolic overlays of landing sites, and topographical features.

a configuration for representing geospatial space including defined quadrants for projecting flight vectors and glide paths, including associated radio frequencies for maintaining communications with air traffic control facilities.

a predictive reality capability for assisting the pilot with anticipated conditions along a flight path; an automated flight path control system that updates pertinent data thereof to the pilot in real time; and a virtual co-pilot simulated by artificial intelligence.

a voice recognition system integrated into the pilot headgear; and a spatial sound loudspeaker system for reproducing sound sources existing in the space occupied by the advanced helicopter; for supplementing pilot awareness of flight conditions and facilitating avoidance of potential hazards during flight.

an artificial intelligence monitor adaptable via system logic to: prioritize information supplied to the pilot; filter information received by the pilot to ensure accuracy and timeliness; keep pilot abreast of changing conditions; develop alternate flight paths; take command of the helicopter as necessary to implement corrective action; and provide collision avoidance counter maneuvers.

a virtual reality headgear for passengers including a helmet and a transparent visor attached thereto, wherein the visor serves as a screen for projecting a heads-up display; system applications adapted to provide program material selected from the group consisting of news feeds, entertainment; conferences, flight update information from the pilot; and communication with business associates at remote locations.

Another embodiment of the invention includes an augmented reality flight control system incorporating real-world objects with virtual elements to provide relevant data to a pilot during aircraft flight. A translucent substrate is disposed in the pilot's field of view such that the pilot can see therethrough, and observe virtual elements displayed on the substrate. The system includes a headgear that is worn by the pilot. A flight assistance module is configured to receive data related to the aircraft and provide predictive assistance to the pilot during flight based on the received data based in part on a pilot profile having preferences related to the pilot. A sensory feedback module is configured to provide sensory alerts to the pilot related to the received data and a virtual flight control device is operably connected to the substrate, the headgear, the flight assistance module, and the sensory feedback module, and is configured to generate and display the virtual elements on the substrate. The virtual elements are displayed on the substrate such that the pilot can interact with them.

Yet another embodiment includes a virtual reality content control system incorporating virtual elements to provide relevant content during aircraft flight. The system includes a headgear configured to be worn by a passenger. A translucent substrate is disposed in the passenger's field of view such that the passenger can see therethrough, and observe virtual elements displayed on the substrate. A flight content module is configured to receive data related to the aircraft and provide the received data and additional content based on passenger input to the passenger. A virtual control device is operably connected to the headgear, the substrate, and the flight content module, and configured to generate and display the virtual elements on the substrate, wherein the virtual elements are displayed on the substrate such that the passenger can interact with the virtual elements to trigger an action.

Other embodiments in accordance with the spirit and scope of the invention will become apparent to those of skill in the art.

DETAILED DESCRIPTION OF THE INVENTION

Described herein is an embodiment of an aircraft that advances the state of the art in several significant functional aspects. A pilot flight control space that replaces the traditional—and usually massive—instrument panel with a display plane superimposed in the pilot's line of forward vision between the pilot and the front windscreen, and an augmented reality flight control system that includes headgear for the pilot. The flight control system may be supplemented by flight-assisting artificial intelligence and geo-location systems.

The preferred version of the invention presented in the following written description and the various features and advantageous details thereof are explained more fully with reference to the non-limiting examples included in the accompanying drawings and as detailed in the description which follows. Descriptions of well-known components and processes and manufacturing techniques are omitted so as to not unnecessarily obscure the principle features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

Figure 1:
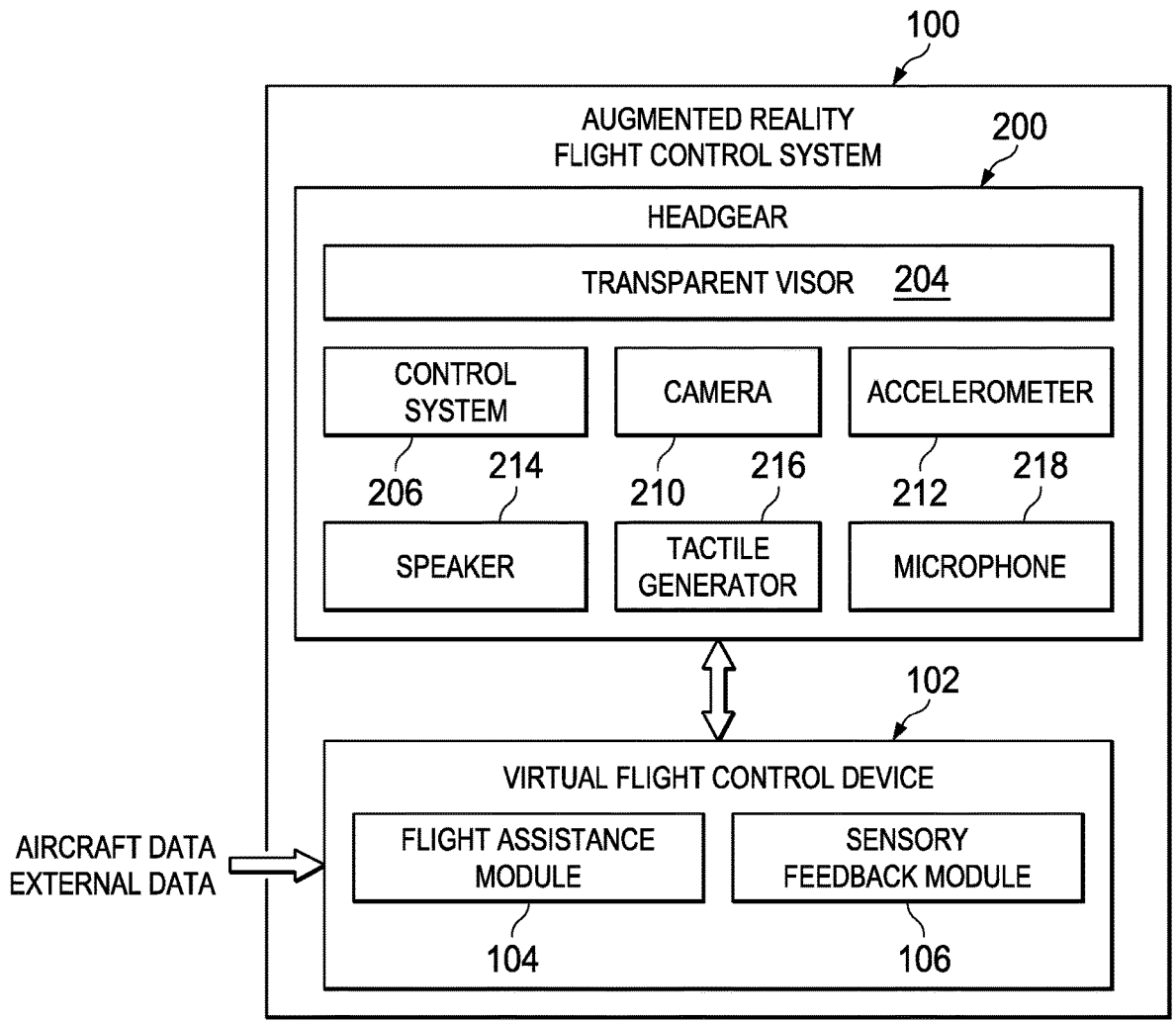
FIG. 1 illustrates a block diagram of the augmented reality flight control system (ARFCS), in accordance with one embodiment of the present invention.

Referring to FIG. 1, there is shown a block diagram of the augmented reality flight control system (ARFCS) 100, in accordance with one embodiment of the present invention. ARFCS 100 includes headgear 200, having a transparent visor 204, control system 206, camera 210, accelerometer 212, speaker 214, tactile generator 216, and microphone 218, and virtual flight control device (VFCD) 102, having a flight assistance module 104 and sensory feedback module 106. VFCD 102 is configured to receive aircraft data, such as flight speed, altitude, engine temperature, fuel levels, and other data related to the aircraft. VFCD 102 is also configured to receive external data, such as geolocation signals, communication signals, weather data, and other external data related to the aircraft flight.

VFCD 102 generates the virtual elements for display on the translucent substrate, such as the visor 204. The virtual elements are displayed on the translucent substrate such that real-world objects can still be seen. Real-world objects can be over-laid with virtual reality elements to provide additional information to the pilot. For example, an artificial horizon line can be displayed substantially across the pilot's field of view, or street names can be overlaid on roads seen through the visor 204 by the pilot. VFCD 102 also generate virtual elements related to the received aircraft data, such that the virtual instrumentation control panels can be populated with real-time data. Additionally, functional widgets may be placed in the field of view of the pilot at a location of his or her choosing. Each pilot may configure a pilot profile with specific data, instruments, alerts, and other relevant information. The VFCD 102 reads the pilot profile upon pilot login and configures the system according to the profile, such that each pilot can have the information he or she desires, when he or she desires, where he or she desires. This flexibility greatly increases usability and performance of the system. VFCD 102 is operably connected to headgear 200 via cables 208, wireless radios, or other suitable means for data exchange.

VFCD 102 includes Flight Assistance Module (FAM) 104. FAM 104 is configured to provide predictive information to the pilot, such that the pilot does not have to perform time-consuming routine tasks. For example, as a pilot is comes within range of a ground station frequency, instead of manually having to change the radio frequency to the requisite frequency, FAM 104 having received the helicopter's geolocation and correlated it with the intended flight plan, current flight segment of the flight plan (departure, en route, approach, tower, ground etc.) system logic will auto-tune the appropriate frequency and await confirmation to switch frequencies based on pilot authorization. This reduces the pilots need to divide their attention to manually look-up and or tune the correct frequency. Additionally the system is intended to be linked with the governing aviation database to ensure the current frequency databases is being used. This system decreases pilot workload, saving the pilot time and energy and increasing efficiency. Advantageously, FAM 104 can interact with the pilot via voice commands to perform the requisite task. For example, a pilot can audible ask the FAM 104 to open a communication line to the passenger cabin. FAM 104 receives the audio signal via the headgear microphone, processes the received signal to extract data, correlates the extracted data against a dictionary of commands and executes the command. The pilot can then speak via the microphone to the passenger cabin. Other examples include adjustment of altitude, adjustment of cockpit temperature, and other relevant functions via voice commands. The FAM 104 can also respond to commands via digitized voice responses played back via the headgear speakers. The FAM 104 can be disposed within the VFCD 102, integrated into another device, or a stand-alone device.

Sensory Feedback Module (SFM) 106 is configured to provide control signals to the tactile generator in the headgear 200. Sensory feedback module can vary the speed and duration of a motor to provide notifications via a pilot's sense of touch. Alternatively, SFM 106 can cause compression of compression cuffs, and control other tactile devices. The SFM 106 can be disposed within the VFCD 102, integrated into another device, or a stand-alone device.

VFCD 102 can also include a flight content module (FCM) (not shown) to receive data related to the aircraft and provide the received data and additional content based on passenger input to the passenger. The FCM can provide entertainment, productivity, and flight related content to a passenger. For example, the FCM can receive video signals streamed from content providers for passenger playback. Additionally, the FCM can provide conference call connectivity to allow passengers to communicate via audio or visual conferencing. Video game capabilities are also provided by the FCM. A passenger can interact with a video game via hand gestures or a controller. The FCM can be disposed within the VFCD 102, integrated into another device, or a stand-alone device.

The VFCD 102, FAM 104, SFM 106, and FCM can be implemented on one or more servers, having one or more processors, with access to electronic storage. Server(s) may include electronic storage, one or more processors, and/or other components. Server(s) may include communication lines, or ports to enable the exchange of information with a network and/or other computing platforms. Server(s) may include a plurality of hardware, software, and/or firmware components operating together to provide the functionality attributed herein to server(s). For example, server(s) may be implemented by a cloud of computing platforms operating together as server(s).

Electronic storage may comprise non-transitory storage media that electronically stores information. The electronic storage media of electronic storage may include one or both of system storage that is provided integrally (i.e., substantially non-removable) with server(s) and/or removable storage that is removably connectable to server(s) via, for example, a port (e.g., a USB port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). Electronic storage may store software algorithms, information determined by processor(s), information received from server(s), information received from computing platform(s), and/or other information that enables server(s) to function as described herein.

Processor(s) may be configured to provide information processing capabilities in server(s). As such, processor(s) may include one or more of a digital processor, an analog processor, a digital circuit designed to process information, an analog circuit designed to process information, a state machine, and/or other mechanisms for electronically processing information. Although processor(s) as a single entity, this is for illustrative purposes only. In some implementations, processor(s) may include a plurality of processing units. These processing units may be physically located within the same device, or processor(s) may represent processing functionality of a plurality of devices operating in coordination.

Processor(s) may be configured to execute machine-readable instruction modules by software, hardware, firmware, some combination of software, hardware, and/or firmware, and/or other mechanisms for configuring processing capabilities on processor(s). As used herein, the term "machine-readable instruction component" may refer to any component or set of components that perform the functionality attributed to the machine-readable instruction component. This may include one or more physical processors during execution of processor readable instructions, the processor readable instructions, circuitry, hardware, storage media, or any other components.

Figure 2:
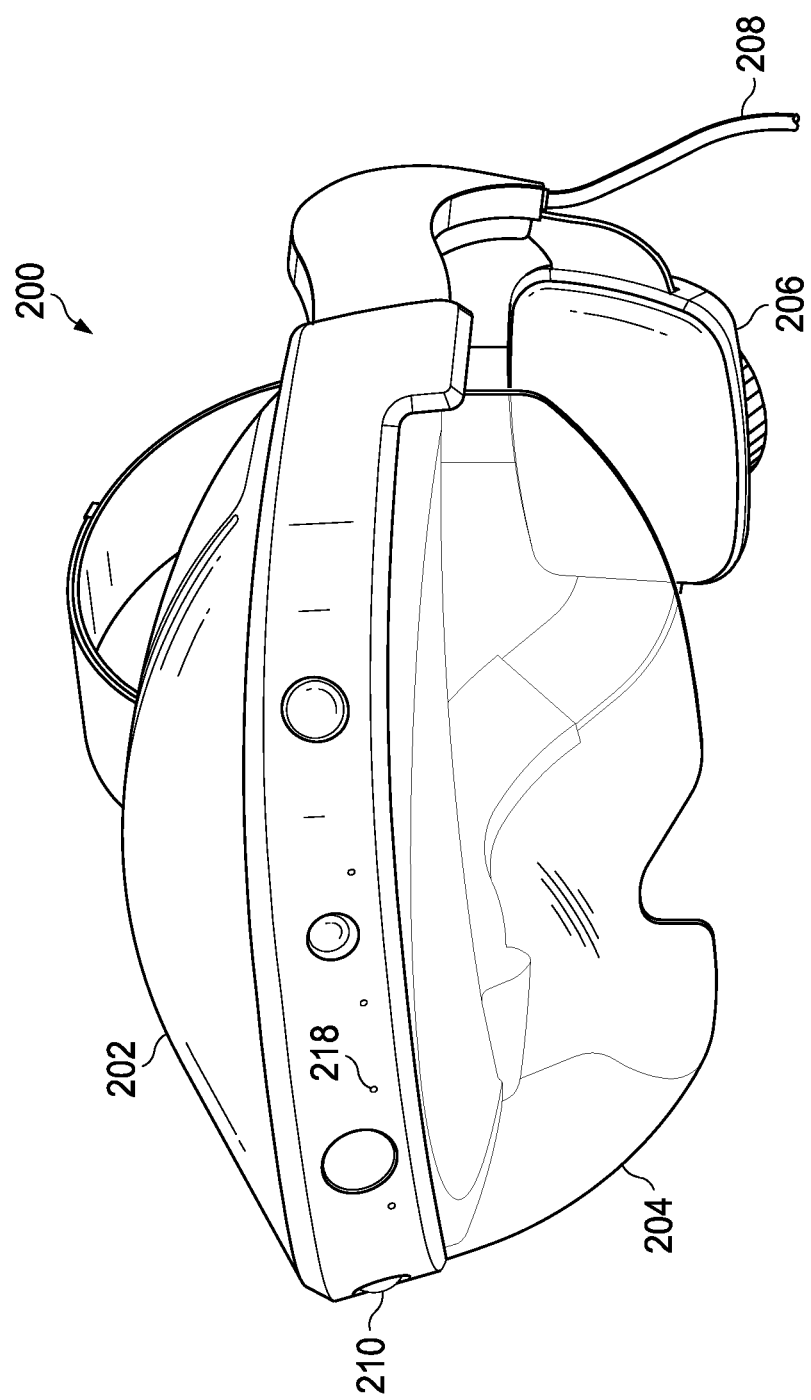
FIG. 2 illustrates one embodiment of a headgear apparatus for use by a pilot and/or passengers, in accordance with one embodiment of the present invention.

FIG. 2 illustrates one embodiment of a headgear apparatus for use by a pilot and/or passengers, in accordance with one embodiment of the present invention. The headgear 200 provides the pilot (or a passenger in an alternative embodiment) with a headset adapted to the augmented reality flight control system (ARFCS) 100. The headset includes a translucent substrate, such as transparent visor 204 that allows the pilot to see through the visor 204 into the space outside the headgear 200. The visor 204 can be made of an impact-resistant material, such as polycarbonate, or other suitable translucent material. A plurality of cameras 210 are disposed around the crown of the headgear 200, under a housing 202, to provide visual input to the ARFCS 100. The visor 204 may also function as a display screen for virtual elements generated by the ARFCS 100. The headgear 200 may be connected to a server system (not shown) via a cable 208. The cables 208 may connect to adapters located in the seat or directly to the servers. In one embodiment, the headgear 200 can function as a display, rendering the content provided to it from the ARFCS 100. In another embodiment, data from the ARFCS 100 can be uploaded and stored on the headgear 200 during pre-flight, to speed the rendering and environment processing on the headgear 200. One or more processors and electronic storage can be disposed within the control system 206, disposed within the headgear 200. Advantageously, the control system 206 can be an embedded system that receives periodic updates from the ARFCS 100.

A microphone 218 is integrated into the headgear 200 to allow for audio input to the ARFCS. In order to determine the position of the wearer's head in three-dimensional space, a plurality of accelerometers 212 (not shown) are integrated into the headgear 200. A plurality of speakers 214 (not shown) are disposed within the headgear 200 to provide directional sound to the user. The headgear 200 also includes a tactile generator 216 (not shown) to create tactile feedback to the user. The tactile generator 216 can be a servo motor that generates vibrations, or other suitable device. Advantageously, headgear 200 allows the wearer to view real-world and virtual elements simultaneously, while receiving visual, auditory, and tactile input from the ARFCS.

Figure 3:
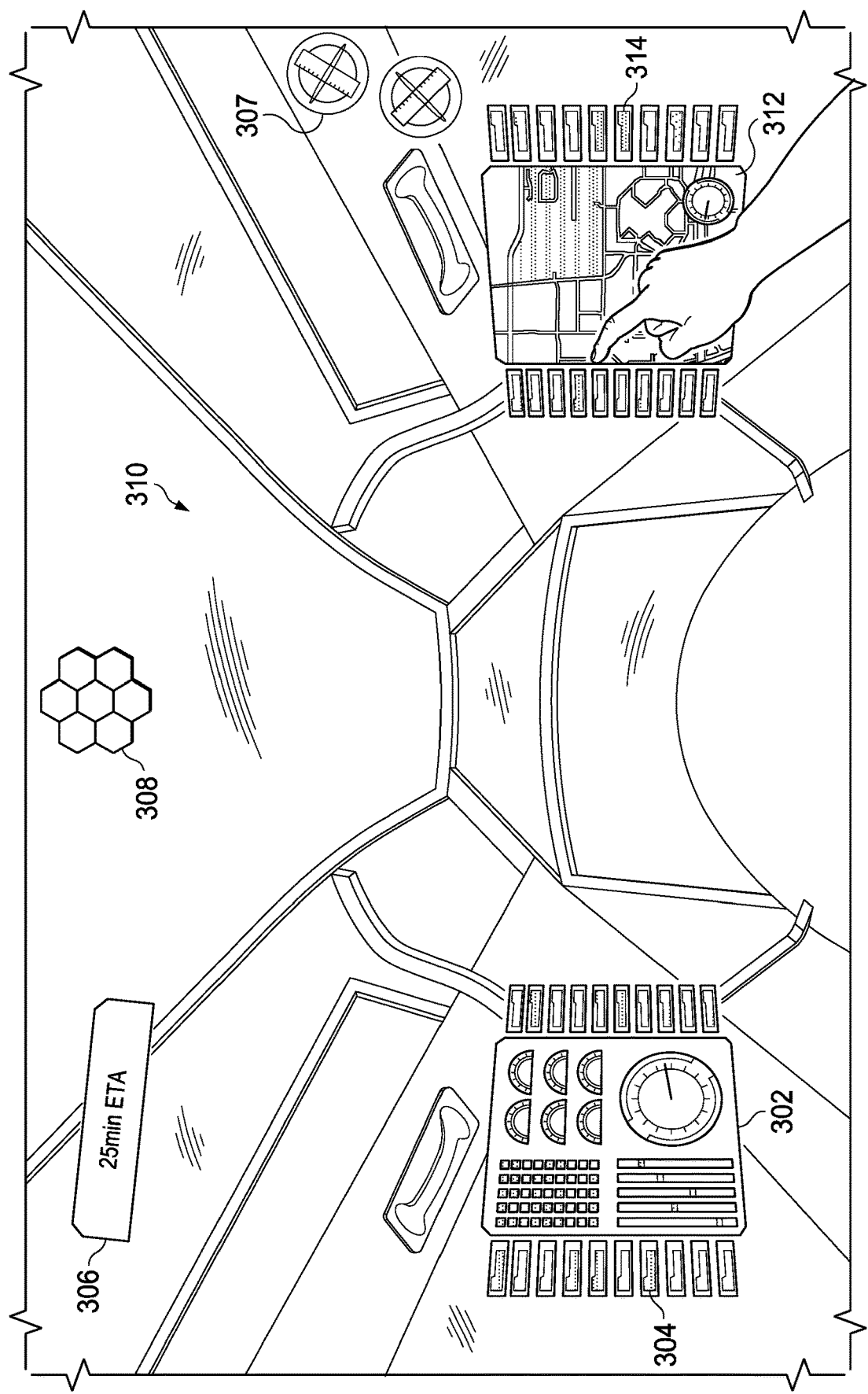
FIG. 3 illustrates a view from inside an aircraft, showing the images generated in a display space superimposed in a virtual plane in front of the pilot, and showing the expanded view of the ground topography through the transparent front windows, in accordance with one embodiment of the present invention.

FIG. 3 illustrates a view from inside an aircraft, showing the images generated in a display space superimposed in a virtual plane in front of the pilot, and showing the expanded view of the ground topography through the transparent front windows, in accordance with one embodiment of the present invention. The virtual plane may be displayed by the headgear 200 or the windows 310. To the left in the figure is one example of a virtual element, virtual instrument panel 302 that includes an array of touch or "point-sensitive" command or control pads 304. To the right in the figure is another example of a virtual element, virtual display panel 312, which may include a graphic display of information related to the helicopter systems, flight plans, and the like. The display image may also include an array of "point-sensitive" command or control pads 314. Also visible in FIG. 3 is a pilot's arm pointing toward one of the "touch-sensitive" pads 314 to initiate some action involving the system. The floor of the aircraft appears just below the forward line of sight of the pilot. Without a bulky instrument panel, a much broader viewable area is available to the pilot.

In one example, a virtual instrumentation panel may be shown before the pilot, with a virtual representation of a radio on the left side and a virtual representation of a flight map on the right side. As the pilot needs to interact with the virtual radio, he turns his head to the left and extends his or her arm toward the virtual radio, a plurality of options related to the radio functionality are provided to the pilot. After the pilot completes his or her interaction with the radio, the pilot turns his or her head to the right. In so doing, the ARFCS minimizes the virtual radio options to show the original virtual representation of the radio in the virtual instrumentation panel. As the pilot's head turns to the right, the pilot extends his or her arm toward the virtual map and a plurality of options related to the virtual map's functionality are provided to the pilot. In this way, the pilot can interact with a virtual representation of each instrument on a traditional instrumentation panel with additional capabilities available and minimal clutter in the pilot's field of view. The accelerometers 212 in the headgear determine the direction the pilot's head is facing and provides virtual elements relevant to the pilot's head position. Furthermore, the headset is equipped with a center field-of-view marker. This marker denotes where the pilot is looking. When the pilot is looking at a virtual flight instrumentation such as a communication radio and the center marking is located on the virtual communication radio image, the system knows the pilot's attention is focused on modifying or manipulation communication attributes of the aircraft. The system will await a pertinent communication command and/or display a quick table of command or preset command pertaining to aircraft communications. The visor 204 displays the virtual elements such that the pilot can interact with the virtual elements. One or more cameras 210 in the headgear 200 capture when and where a pilot is reaching or gesturing so that the ARFCS 100 can determine which virtual interaction should be displayed on the visor. The speakers 214 in the headgear 200 allow the ARFCS to provide audible notifications in a certain direction to the pilot. If the pilot is looking at the virtual radio on the left and is going off course, the ARFCS may provide an audible notification to the pilot such that the pilot perceives the notification coming from the right side. Thereby allowing him to turn his head to engage with the notified condition. Alternatively, the virtual elements can be displayed on the windows 310 of the aircraft. An artificial intelligence icon 308 is positioned such that the pilot is aware of the status of the AI system. Additionally, the pilot would have the ability to fix desired flight instrumentation functional widgets, such as estimated time of arrival display 306 and gyroscope indicator 307, among others, to the field of view and remain in the pilot's field of view wherever the pilot's head is moved. Conversely, the pilot would have the ability to pin specific flight instrumentation functional widgets, such as estimated time of arrival display 306 and gyroscope indicator 307, among others, to any area within the pilot's virtual field of view. That data would remain fixed in that virtual location regardless where the pilot is looking. To access the pinned data the pilot would simple look to the location the item was previously pinned.

Figure 4:
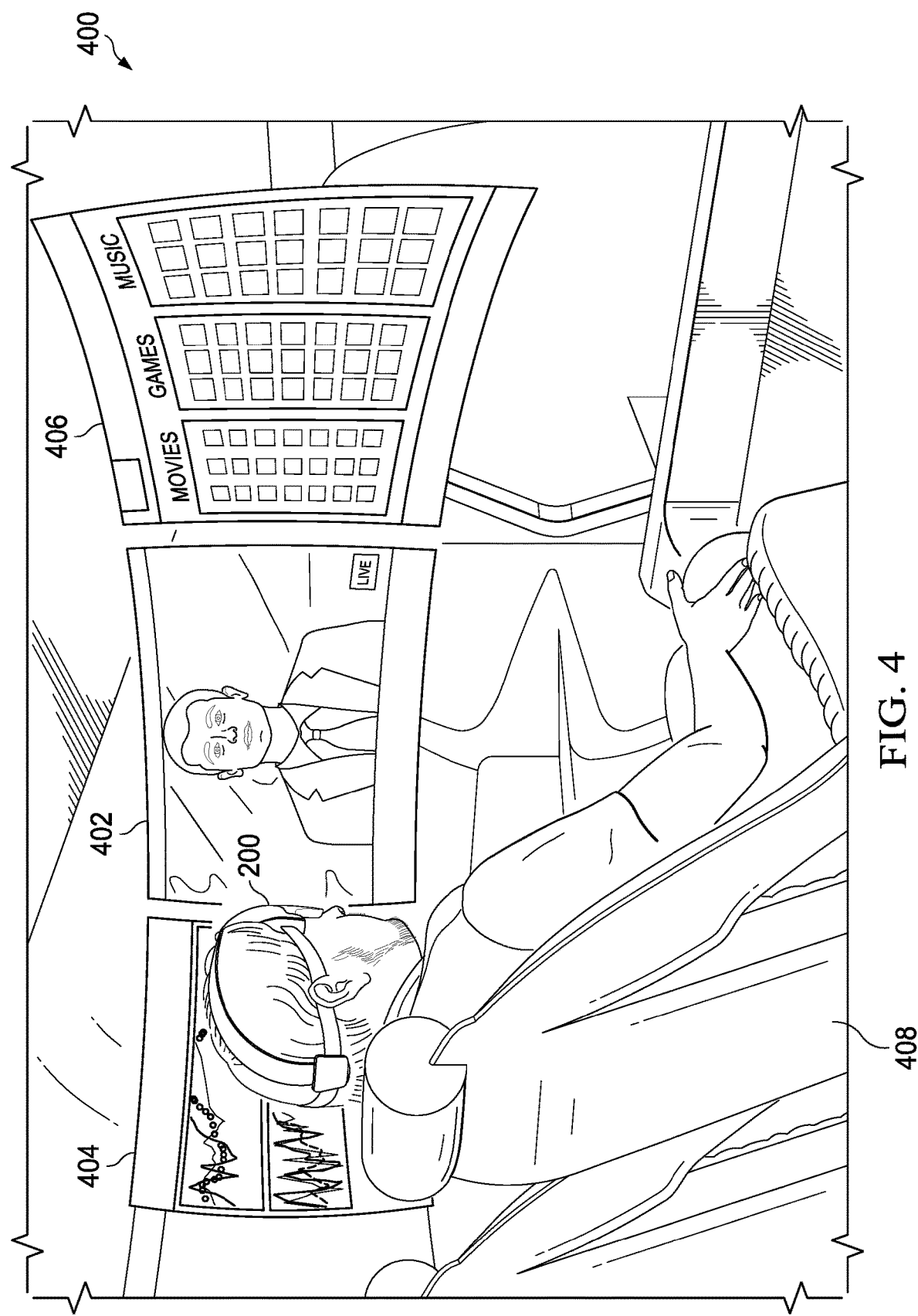
FIG. 4 illustrates a forward oblique view of a passenger viewing a panoramic set of images generated in a display space superimposed in a virtual plane in front of the passenger.

FIG. 4 illustrates a forward oblique view of a passenger viewing a panoramic set of images generated in a display space superimposed in one or more virtual planes 402, 404, and 406 in front of the passenger. A passenger is depicted wearing a headgear apparatus 200. The headgear apparatus 200 may be configured for passenger use, including entertainment, news or economic data feeds, or information specific to a particular preference. As with the pilot, the accelerometers in the passenger's headgear 200 determine the direction the passenger's head is facing and provides virtual elements relevant to the passenger's head position. The visor displays the virtual elements such that the passenger can interact with the virtual elements. The cameras in the visor capture when and where a passenger is reaching or gesturing so that the ARFCS 100 can determine which virtual interaction should be displayed on the visor. The speakers in the headgear 200 allow the ARFCS to provide audible, directional notifications to the passenger. Alternatively, the virtual elements can be displayed on a translucent substrate disposed within the passenger cabin, or other suitable display apparatus.

Examples of possible virtual images include a news feed 402, a real-time economic data graphic 404, and a selection panel 406 of movies, games, and/or music available from an entertainment service. Alternatively, a passenger can choose to not wear the headgear 200. In such an embodiment, the ARFCS 100 displays the virtual elements on one or more translucent substrate panels mounted to the ceiling, or other suitable display apparatus. The passenger's interaction with the virtual elements on the panels can be monitored visually, via cameras disposed within the passenger cabin, or tactilely, via touch screen disposed on the panels or seat. A passenger can create a passenger profile including location and content preferences for virtual elements. A user can log into the system via user name and password, biometric access, or other suitable access.

Figure 5:
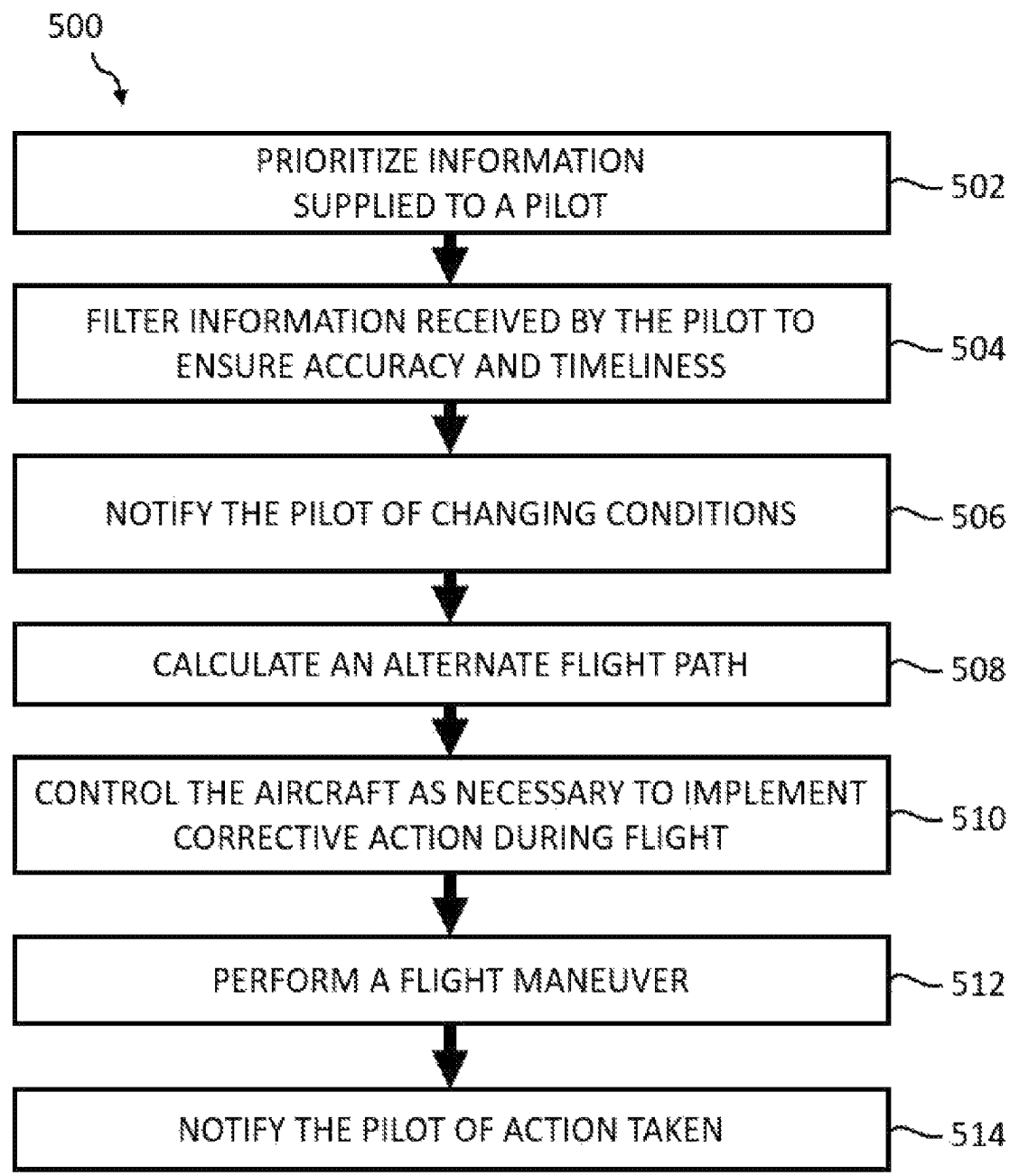
FIG. 5 illustrates a block diagram of an artificial intelligence monitor method.

FIG. 5 illustrates a block diagram of an artificial intelligence monitor method. An artificial intelligence monitor may include one or more processors configured to execute machine-readable instructions. The machine-readable instructions may be configured to enable a user to interface with the artificial intelligence monitor and/or external resources, and/or provide other functionality attributed herein to the artificial intelligence monitor.

The artificial intelligence monitor can be implemented on one or more servers, having one or more processors, with access to electronic storage. Processor(s) may be configured to execute machine-readable instruction components 502, 504, 506, 508, 510, 512, 514, and/or other machine-readable instruction components. Processor(s) may be configured to execute machine-readable instruction components 502, 504, 506, 508, 510, 512, 514, and/or other machine-readable instruction components by software; hardware; firmware; some combination of software, hardware, and/or firmware; and/or other mechanisms for configuring processing capabilities on processor(s).

It should be appreciated that although machine-readable instruction components 502, 504, 506, 508, 510, 512, and 514 are preferably implemented within a single processing unit, in implementations in which processor(s) includes multiple processing units, one or more of machine-readable instruction components 502, 504, 506, 508, 510, 512, and 514 may be implemented remotely from the other machine-readable instruction components. The description of the functionality provided by the different machine-readable instruction components 502, 504, 506, 508, 510, 512, and/or 514 described below is for illustrative purposes, and is not intended to be limiting, as any of machine-readable instruction components 502, 504, 506, 508, 510, 512, and/or 514 may provide more or less functionality than is described. For example, one or more of machine-readable instruction components 502, 504, 506, 508, 510, 512, and/or 514 may be eliminated, and some or all of its functionality may be provided by other ones of machine-readable instruction components 502, 504, 506, 508, 510, 512, and/or 514. As another example, processor(s) may be configured to execute one or more additional machine-readable instruction components that may perform some or all of the functionality attributed below to one of machine-readable instruction components 502, 504, 506, 508, 510, 512, and/or 514.

In some implementations, one or more operations of method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, method 500 can prioritize, by one or more processors, information supplied to a pilot. As an example, a pilot can receive information related to aircraft speed, course, position, and other suitable aircraft information. Operation 502 may be performed by one or more physical processors configured to execute a machine-readable instruction component, in accordance with one or more implementations. The method 500 then proceeds to operation 504.

At an operation 504, method 500 can filter, by one or more processors, information received by the pilot to ensure accuracy and timeliness. As an example, the artificial intelligence monitor can eliminate aircraft information that has a timestamp later a predetermined threshold. Alternatively, the artificial intelligence monitor can only provide alerts for values that exceed a certain threshold (such as engine temperature, etc.) or fall below certain thresholds (such as fuel level, etc.), but exclude values that are within predetermined thresholds. Operation 504 may be performed by one or more physical processors configured to execute a machine-readable instruction component, in accordance with one or more implementations. The method 500 then proceeds to operation 506.

At an operation 506, method 500 can notify, by one or more processors, the pilot of changing conditions. As an example, the artificial intelligence monitor can generate and provide a visual alert on the pilot's visor, indicating that one or more conditions has changed, such as decreased altitude, inclement weather in the aircrafts flight path, or other change in condition related to the aircraft and the aircrafts trajectory. Alternatively, the artificial intelligence monitor can generate and provide a visual alert on the pilot's visor, indicating after a plurality of conditions have changed (such as airspeed, altitude, engine temperature, and/or other suitable engine parameters), thereby indicating an event, such as engine failure. Operation 506 may be performed by one or more physical processors configured to execute a machine-readable instruction component, in accordance with one or more implementations. The method 500 then proceeds to operation 508.

At an operation 508, method 500 can calculate, by one or more processors, an alternate flight path. As an example, the artificial intelligence monitor can, based upon the received and generated information, calculate an alternate flight path, avoiding weather conditions and accounting for available fuel. Alternatively, the artificial intelligence monitor can generate a plurality of flight plans and present them to the pilot for selection via the visor. Operation 508 may be performed by one or more physical processors configured to execute a machine-readable instruction component, in accordance with one or more implementations. The method 500 then proceeds to operation 510.

At an operation 510, method 500 can control, by one or more processors, the aircraft as necessary to implement corrective action during flight. As an example, the artificial intelligence monitor can adjust the aircraft's heading, without user input, to maintain course pursuant to the flight plan. The artificial intelligence monitor can adjust the yaw of an aircraft via traditional mechanisms operably engaged to the artificial intelligence monitor with devices, such as actuators and controllers. Alternatively, the artificial intelligence monitor can adjust the aircraft's altitude to adhere to predetermined altitudes pursuant to a flight plan. Operation 510 may be performed by one or more physical processors configured to execute a machine-readable instruction component, in accordance with one or more implementations. The method 500 then proceeds to operation 512.

At an operation 512, method 500 can perform, by one or more processors, a flight maneuver. As an example, an aircraft may detect an obstacle during flight (via one or more sensors disposed on the aircraft, including RADAR, LIDAR, acoustic, visual, or other suitable sensors) and need to climb to avoid collision and descend to conform with altitude restrictions. Alternatively, the aircraft may need to move laterally around an obstacle to avoid collision, but then must return to its original course, pursuant to a flight plan. Operation 512 may be performed by one or more physical processors configured to execute a machine-readable instruction component, in accordance with one or more implementations. The method 500 then proceeds to operation 514.

At an operation 514, method 500 can notify, by one or more processors, the pilot of action taken. As an example, the artificial intelligence monitor can generate and provide a visual alert on the pilot's visor indicating that the aircraft's heading has been modified, the aircraft's altitude has been modified, that conditions are no longer changing, or other suitable notification. Alternatively, the artificial intelligence monitor can generate and provide an audible or tactile alert to the pilot. Operation 514 may be performed by one or more physical processors configured to execute a machine-readable instruction component, in accordance with one or more implementations. The method 500 then ends.

Exemplary implementations may facilitate aircraft maneuvers, such as take off, landing, course correction, or other suitable aircraft maneuver. For example, the artificial intelligence monitor can correct a pilot's over-corrections during landing to facilitate safer, more efficient landings.

The present invention achieves advantages over the prior art by augmenting real-world input with real-world information related to the aircraft. Additionally, large instrument panels are removed, allowing for increased pilot visibility and diminished weight considerations that directly affects fuel efficiency, maneuverability, and the capacity of the aircraft to carry payloads, among others. Augmented reality systems allow for auto-correction of human error and the presentation of relevant timely data related to the aircraft during flight. Highly customizable, a pilot's preferences can be stored and applied during flight to further facilitate the system's efficacy. Passengers can access and interact with content in a customized, engaging way. With the use of a headgear, passenger privacy can be advanced as other passengers cannot view what you are viewing, including e-mail, video content and audio content.

While the present invention has been described in detail, it is not intended to be limited. Accordingly, various changes, variations, and substitutions may be made without departing from the spirit or scope of the invention as disclosed.

What is claimed is:

1. An augmented reality flight control system, comprising:
    a virtual flight control device operably coupled to a translucent substrate disposed in a pilot's field of view and configured to generate and display one or more virtual elements on the substrate;
    a flight assistance module configured to receive data related to the aircraft and provide predictive assistance to the pilot during flight;
    a flight-assisting artificial intelligence system operably coupled to the pilot headgear system, wherein the artificial intelligence system is adapted to:
    control, by one or more processors, the aircraft as necessary to implement corrective action during flight; and
    perform, by one or more processors, a flight maneuver.

2. The augmented reality flight control system of claim 1, further comprising a plurality of speakers, positioned to provide directional sound related to a location of objects and virtual elements inside and outside of an aircraft such that the pilot perceives a sound emanating from a direction of the location.

3. The augmented reality flight control system of claim 1, further comprising a camera configured to receive visual input related to the pilot.

4. The augmented reality flight control system of claim 1, further comprising a microphone configured to receive audible input from the pilot.

5. The augmented reality flight control system of claim 1, further comprising a plurality of accelerometers coupled to the headgear and configured to determine the position of the pilot's head in three-dimensional space.

6. The augmented reality flight control system of claim 1, wherein the flight assistance module auto-tunes a radio's frequency based on the location of the aircraft.

7. The augmented reality flight control system of claim 6, wherein the flight assistance module awaits pilot authorization to change radio frequencies.

8. The augmented reality flight control system of claim 1, further comprising a sensory feedback module configured to provide sensory alerts to the pilot related to the received data.

9. The augmented reality flight control system of claim 1, wherein the artificial intelligence system is further adapted to:
    prioritize, by one or more processors, information supplied to a pilot; and
    filter, by one or more processors, information received by the pilot to ensure accuracy and timeliness.

10. An aircraft, comprising:
    a pilot headgear system including an accelerometer that generates head position data, a helmet, and a transparent visor attached to the helmet, wherein the visor provides a virtual display of at least a portion of an instrument panel on the visor, dependent on the head position data; and
    an augmented reality flight control system integrated with and operable from the pilot headgear system, wherein the flight control system includes a flight-assisting artificial intelligence system integrated with and operable from the pilot headgear system, wherein the artificial intelligence system is adapted to:
    notify, by one or more processors, the pilot of changing conditions; and
    control, by one or more processors, the aircraft as necessary to implement corrective action during flight.

11. The aircraft of claim 10, wherein the pilot headgear system includes a camera for capturing data related to objects and gestures.

12. The aircraft of claim 11, wherein the augmented reality flight control system can determine locations of hand gestures and correlate the gesture location with the virtual display to determine one or more functions related to the portion of an instrument panel.

13. The aircraft of claim 12, wherein the augmented reality flight control system can display the one or more functions on the visor.

14. The aircraft of claim 10, further comprising a communications headset including microphone and loudspeakers embedded within the pilot headgear.

15. The aircraft of claim 10, further comprising a virtual display system configurable to display computer-generated images, via one or more processors, for presenting and manipulating at least flight information, flight plans, maps, spatial representations and symbolic overlays of landing sites, and topographical features.

16. The aircraft of claim 10, further comprising a configuration for representing geospatial space including defined quadrants for projecting flight vectors, glide paths, or radio frequencies.

17. The aircraft of claim 10, wherein the pilot headgear system further comprises:
    a predictive reality module for assisting the pilot with anticipated conditions along a flight path; and
    an automated flight path control system that updates pertinent data thereof to the pilot in real time.

18. The aircraft of claim 10, wherein the pilot headgear system further comprises a voice recognition system.

19. The aircraft of claim 10, wherein the artificial intelligence system is further adapted to:
    prioritize, by one or more processors, information supplied to a pilot; and
    filter, by one or more processors, information received by the pilot to ensure accuracy and timeliness.

20. The aircraft of claim 10, wherein the artificial intelligence system is further adapted to:
    calculate, by one or more processors, an alternate flight path; and
    perform, by one or more processors, a flight maneuver.

* * * * *